(No Model.) 2 Sheets—Sheet 1.
L. GIST.
AUTOMATIC CHECK ROW CORN PLANTER.
No. 593,647. Patented Nov. 16, 1897.
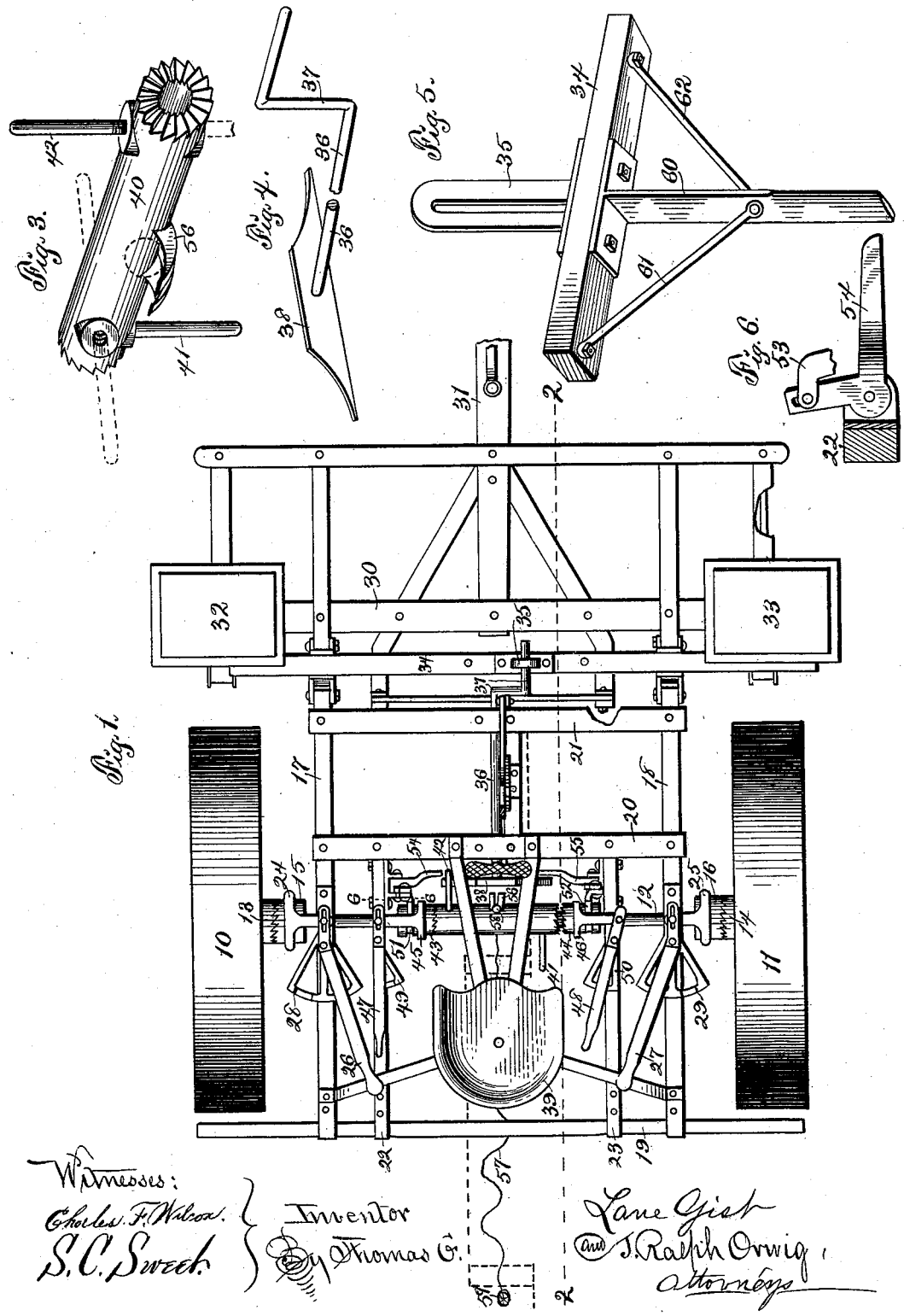

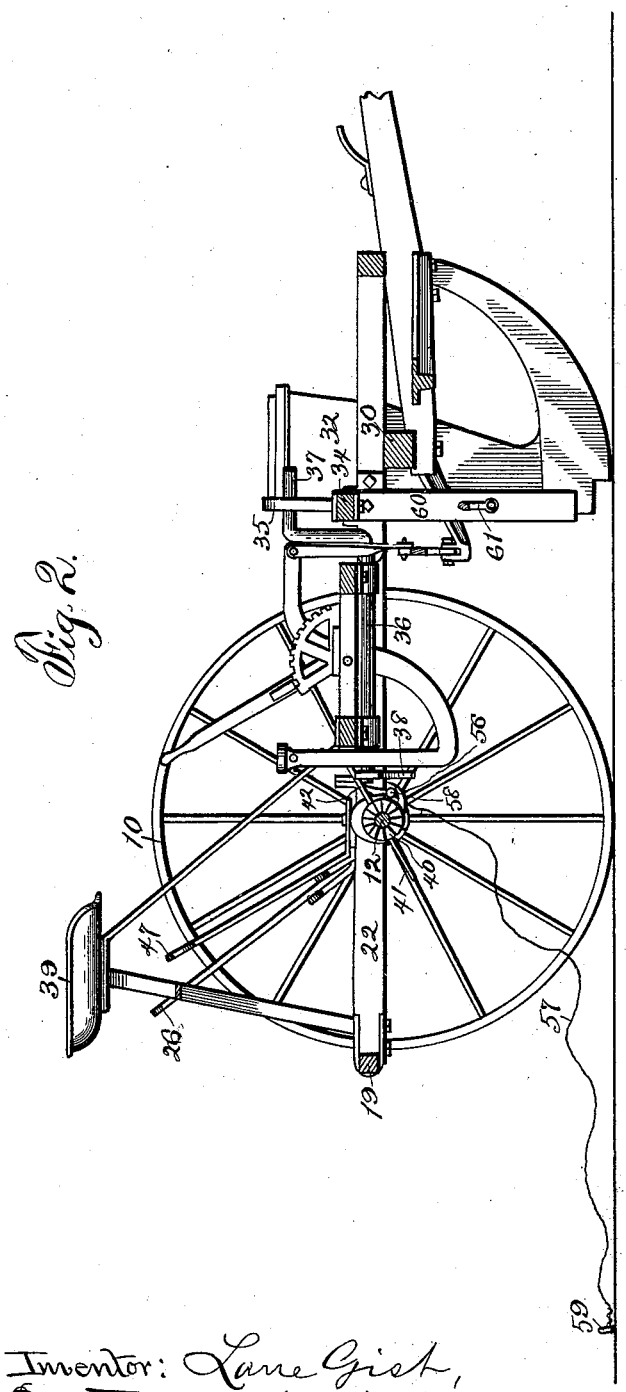

UNITED STATES PATENT OFFICE.

LANE GIST, OF LAKE CITY, IOWA, ASSIGNOR OF ONE-HALF TO GEORGE L. BROWER, OF CHICAGO, ILLINOIS.

AUTOMATIC CHECK-ROW CORN-PLANTER.

SPECIFICATION forming part of Letters Patent No. 593,647, dated November 16, 1897.

Application filed May 11, 1897. Serial No. 636,114. (No model.)

*To all whom it may concern:*

Be it known that I, LANE GIST, a citizen of the United States, residing at Lake City, in the county of Calhoun and State of Iowa, have invented a new and useful Automatic Check-Row Corn Planter and Drill, of which the following is a specification.

The object of this invention is to provide improved means for automatically dropping seed-corn in hills or drills, the corn when dropped in hills being in check-rows.

This invention consists in the construction, arrangement, and combination of elements hereinafter set forth, pointed out in my claims, and illustrated by the accompanying drawings, in which—

Figure 1 is a plan of the machine, portions thereof being broken away. Fig. 2 is a sectional elevation of the machine on the indicated line 2 2 of Fig. 1. Fig. 3 is a perspective of a sleeve employed to actuate the dropping mechanism, shown detached from the shaft whereby it is driven, the dotted lines therein indicating different positionings of the actuating-arms thereon. Fig. 4 is a perspective of a rock-shaft employed in conjunction with the sleeve shown in Fig. 3 to actuate the dropping mechanism. Fig. 5 is a perspective of a portion of the dropping mechanism, showing the means whereby the same is actuated by the rock-shaft shown in Fig. 4, and in addition thereto showing a hill-marker attached thereto. Fig. 6 is a rear elevation of a portion of the mechanism, a portion of the frame of the machine being shown in section on the line 6 6 of Fig. 1.

In the construction of the machine, as shown, the numerals 10 11 designate supporting and traction wheels mounted loosely on a shaft or axle 12. The wheels 10 11 are provided with clutch members 13 14 on the inner ends of their hubs, which clutch members are ratchet-shaped and so arranged as to mesh at times with mating clutch members 15 16, slidingly mounted upon and feathered to the shaft 12. The machine-frame, comprising the side bars 17 18, the cross-bars 19, 20, and 21, and auxiliary bars 22 23, parallel with the side bars 17 18, is mounted on the shaft 12, the said shaft being so connected to the frame as to rotate freely in bearings thereon in the common manner. Collars 24 25 are connected with the clutch members 15 16, and also are connected to hand-levers 26 27, fulcrumed on the side bars 17 18 of the planter-frame and engaging racks 28 29 on said frame. The levers 26 27 and the racks 28 29 are so constructed as that the levers will be retained by engagement with the racks in different positions, there manually placed either to hold the clutch members 15 16 in or out of engagement with the clutch members 13 14. By this means provision is made for manually connecting the shaft 12 with one or both of the traction and supporting wheels 10 11.

A dropper-frame 30, of common form, is hinged to the forward end of the planter-frame and is provided with a tongue 31, whereby attachment of draft-animals may be had for the purpose of advancing the planter over the surface of the field to be planted. Seed-boxes 32 33 are mounted on the dropper-frame 30 and are provided with dropping mechanism of common form, (not shown,) the dropping mechanism of the two boxes being connected and conjunctively operated by a reciprocating bar 34, mounted transversely of and upon the dropper-frame. A shackle 35, Fig. 5, is mounted on the central portion of the bar 34 and extends upwardly therefrom, and a rock-shaft 36 is rotatably mounted in bearings fixed to the lower faces of the cross-bars 20 21. The rock-shaft 36 is provided with a crank 37, Fig. 4, and the parallel arm of said crank traverses the shackle 35 a sufficient distance that in the event of an oscillation of the dropper-frame relative to the planter-frame taking place the rock-shaft will still remain in engagement with the shackle 35, being free to move in the slot of said shackle. The rear end portion of the rock-shaft 36 is provided with a cross-head 38, extending transversely of the planter-frame immediately in front of and below the seat 39.

A sleeve 40, Fig. 3, is mounted loosely on the central portion of the shaft 12 and is provided with ratchets on its end portions. The sleeve 40 is provided with pins or actuating-arms 41 42, arranged at right angles to each other at opposite ends of said sleeve and removably and replaceably connected therewith. Clutch members 43 44 are mounted loosely on and feathered to the shaft 12 at opposite ends of the sleeve 40, which clutch members are arranged to mate with and engage the ratchet ends of said sleeve. The clutch members 43 44 are provided with collars 45 46, which collars are connected to hand-levers 47 48, fulcrumed on the auxiliary bars 22 23 of the planter-frame and frictionally slidingly engaging bearing-plates 49 50 on said arms. Collars 51 52 are mounted on the clutch members 43 44 and are provided with forwardly-extending ears, one of which is shown in detail in Fig. 6 and designated by the numeral 53, which ears are pivotally connected to bell-crank tripping-levers 54 55, fulcrumed on bearings fixed to the auxiliary bars 22 23. The tripping-levers 54 55 extend toward each other, at times crossing the orbit of travel of the actuating-arms 41 42 on the sleeve 40. A fork 56 is formed on and projects radially from the central portion of the sleeve 40. A cord or wire 57, preferably about seven feet in length and provided with a ball or knot 58 at one end and a stake 59 at the other end, is provided, the function and operation of which cord or wire hereinafter will be made clear. A marker-bar 60 is fixed to and projects outwardly from the central portion of the dropper-bar 34 in the vertical plane of the groove in the shackle 35, which marker-bar is secured to the bar 34 by braces 61 62.

The drawings illustrate a lever connection between the planter-frame and dropper-frame, whereby the dropper-frame and runners may be oscillated relative to the planter-frame either by hand or foot power; but since such mechanism is common and well known and forms no part of my invention I do not deem it desirable or necessary to explain the same in detail.

In the practical operation of this device and in starting to plant each pair of rows in the field I position the machine ready for starting, fix the stick 59 in the ground, and put the ball or knot 58 on the cord or wire 57 in the fork 56 of the drum 40, permitting said cord or wire to be slack, as illustrated in Figs. 1 and 2. I then disconnect the clutch members 43 44 from the sleeve 40 by manual actuation of the levers 47 48 into the position in which the lever 48 is shown in Fig. 1 and start the machine. Upon starting the machine the cord or wire 57 becomes taut and applies a draft to the fork 56 sufficient to revolve the sleeve 40 and cause one of the arms 41 42 to engage with one end portion of the cross-head 38 with sufficient force to oscillate the rock-shaft 36, which, acting through the crank 37 and shackle 35, moves the dropper-bar 34 longitudinally and actuates the dropping mechanism and drops a hill of corn in each row. The knot 58 of the cord or wire 57 slips out of the fork 56, and at this time and simultaneously with the actuation of the dropper mechanism one of the arms 41 42 engages one of the tripping-levers 54 55 and oscillates the same, the tripping-lever, acting through the lug 53 and collar thereto attached, moving the clutch 43 or 44 into engagement with the sleeve 40. The sleeve 40 is now rotated by the clutch 43 or 44, and at the next succeeding half-revolution of said sleeve the other of the arms 41 42 engages the other of the tripping-levers 54 55 and throws into engagement with the sleeve the other of the clutches 43 44. In the further rotation of the sleeve 40, driven by the clutches 43 44 through the shaft 12, shaft 12 being driven by the clutches 13 14, engaging the clutches 15 16, and the clutches 13 14 being driven by the traction and supporting wheels 10 11, the arms 41 42 of the sleeve will successively, progressively, and continuously engage twice with each revolution of the supporting-wheels with and operate the rock-shaft 36, the rock-shaft each time it is operated by the engagement of the arms 41 42 with its cross-head acting through the shackle 35 and reciprocating the bar 34, to the end that the dropping mechanism in the seedboxes deposits seeds in the ground.

The marker 60 extends downwardly from the bar 34 sufficiently far to travel in the ground, and being rigidly connected to the bar 34 it follows that when said bar is reciprocated it will carry the marker laterally of the line of advancement of the machine and make a mark in the surface of the ground broad and plain, which mark will be in lateral alinement with the hills of corn deposited in the rows and will serve as a guide to the operator whereby to adjust his machine for the dropping of seeds in uniform check-rows in the field. The first two rows being planted and the machine being reversed and directed in a plane parallel with the planes of the first two rows, I employ another of the cords or wires 57 to start the planting of the second pair of rows. From this time forward whenever it is found that the machine, by reason of the uneven surface of the ground upon which it travels, is not dropping corn in rows checking properly with rows previously dropped I disengage one or another, or both, of the clutches by manipulation of the levers and advance the machine to such a degree as will ocularly demonstrate the proper locations or positions of the next succeeding hills of corn relative to those previously planted, repositioning the clutches when the machine has been properly located.

When it is desired to drop the corn in drills, I would remove the pin 41 from the position shown by solid lines in Fig. 3 and place it and another pin of identical construction therewith in the position shown by dotted lines at the left end of said figure, putting the additional pin in the position shown by dotted lines at the right end of said figure. By the use of additional pins or actuating-arms, as described and as illustrated by dotted lines in Fig. 3, I quadruple the capacity of the machine and the rapidity of the operations of the dropping mechanism, thereby depositing the corn in close relations in the rows.

I claim as my invention—

1. In a corn-planter the combination of a shaft, supporting traction-wheels mounted on said shaft, clutch mechanism between said shaft and wheels, a sleeve mounted on said shaft, clutch mechanism between said sleeve and shaft, a rock-shaft, a dropping-bar arranged for reciprocation, a crank connecting said rock-shaft and dropping-bar, a cross-head on the rock-shaft, actuating-arms on the sleeve arranged for alternate engagement with opposite ends of the cross-head, a fork on the sleeve, a short wire, a stake whereby one end of said short wire is stationarily fixed and a bar forming a connection between the opposite end of said short wire and the sleeve.

2. In a corn-planter, a dropping mechanism, a rock-shaft actuating said dropping mechanism, traction mechanism, a tripping mechanism between the traction mechanism and rock-shaft, which tripping mechanism is actuated by a short wire fixed at one end and loosely connected therewith at the other end.

3. In a corn-planter, a rotating shaft, a sleeve thereon, a clutch member arranged for engagement with said sleeve, a tripping-lever arranged to throw said clutch member into engagement with said sleeve, an arm on said sleeve arranged for engagement with the tripping-lever, and a short wire fixed at one end and loosely connected to the sleeve at the other end whereby said sleeve is actuated in the advance of the machine and cause the arms to engage the tripping-lever and throw the clutch of the shaft into engagement with the sleeve, whereby the actuation of the sleeve is continued.

LANE GIST.

Witnesses:
G. C. SMITH,
J. J. HUTCHISON.